July 25, 1933.  J. F. G. P. HARTMANN  1,919,633
APPARATUS FOR COMMUTATING OR PERIODICALLY INTERRUPTING ELECTRIC CURRENTS
Filed Feb. 8, 1932  14 Sheets-Sheet 1

July 25, 1933.   J. F. G. P. HARTMANN   1,919,633
APPARATUS FOR COMMUTATING OR PERIODICALLY INTERRUPTING ELECTRIC CURRENTS
Filed Feb. 8, 1932    14 Sheets-Sheet 2

July 25, 1933.  J. F. G. P. HARTMANN  1,919,633
APPARATUS FOR COMMUTATING OR PERIODICALLY INTERRUPTING ELECTRIC CURRENTS
Filed Feb. 8, 1932  14 Sheets-Sheet 6

July 25, 1933. J. F. G. P. HARTMANN 1,919,633
APPARATUS FOR COMMUTATING- OR PERIODICALLY INTERRUPTING ELECTRIC CURRENTS
Filed Feb. 8, 1932 14 Sheets-Sheet 8
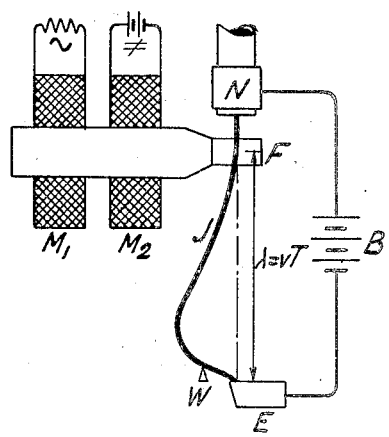
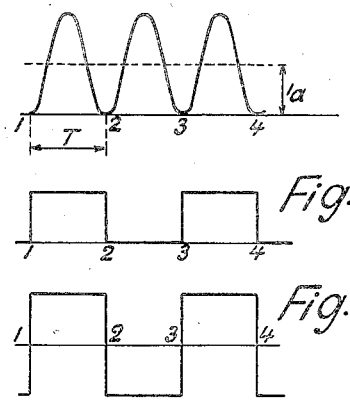
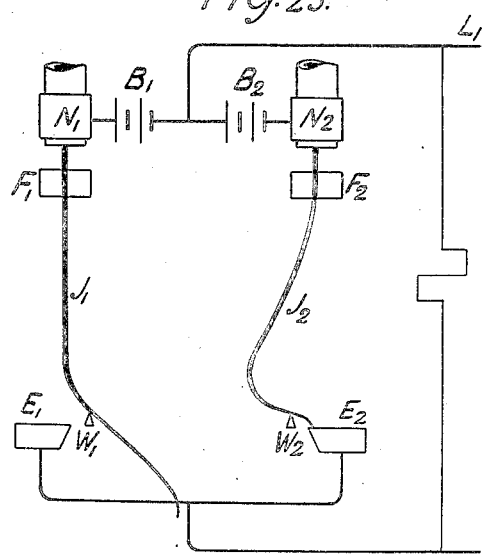

July 25, 1933.    J. F. G. P. HARTMANN    1,919,633
APPARATUS FOR COMMUTATING OR PERIODICALLY INTERRUPTING ELECTRIC CURRENTS
Filed Feb. 8, 1932    14 Sheets-Sheet 10
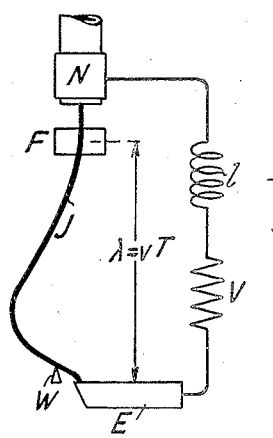
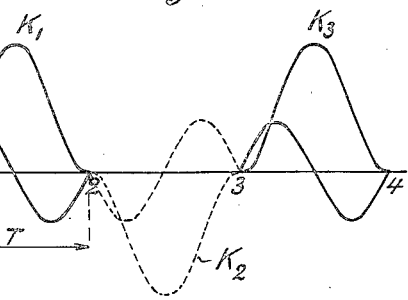
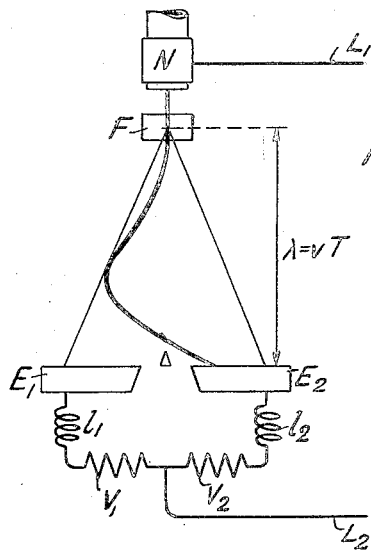

July 25, 1933.    J. F. G. P. HARTMANN    1,919,633
APPARATUS FOR COMMUTATING OR PERIODICALLY INTERRUPTING ELECTRIC CURRENTS
Filed Feb. 8, 1932    14 Sheets-Sheet 13
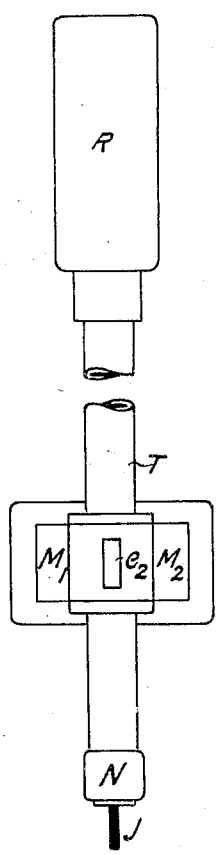
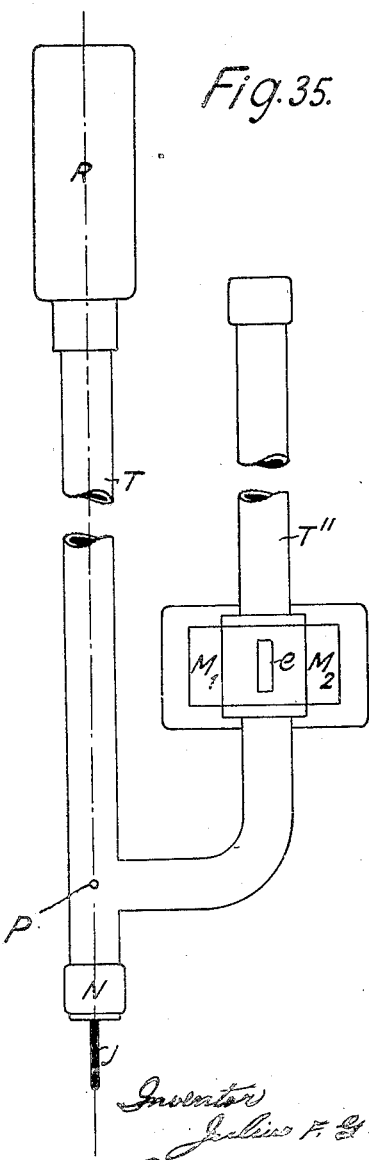
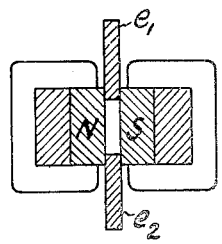

July 25, 1933.    J. F. G. P. HARTMANN    1,919,633
APPARATUS FOR COMMUTATING OR PERIODICALLY INTERRUPTING ELECTRIC CURRENTS
Filed Feb. 8, 1932    14 Sheets-Sheet 14
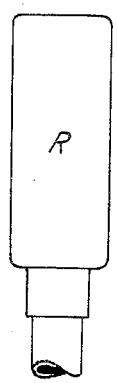
Fig.36.
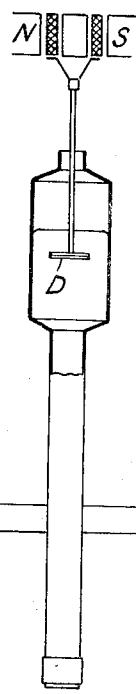
Fig.37.
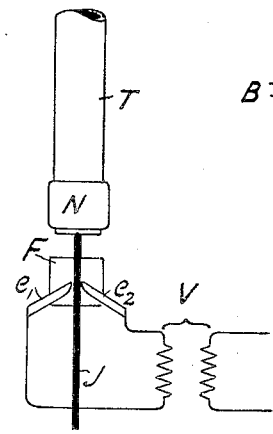
Fig.38.
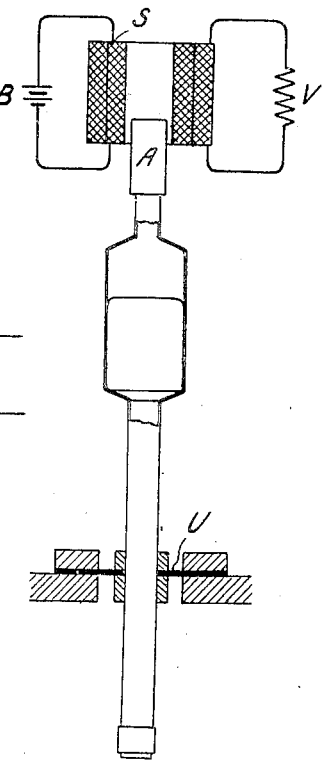

Patented July 25, 1933

1,919,633

UNITED STATES PATENT OFFICE

JULIUS FREDERIK GEORG POUL HARTMANN, OF COPENHAGEN, DENMARK

APPARATUS FOR COMMUTATING OR PERIODICALLY INTERRUPTING ELECTRIC CURRENTS

Application filed February 8, 1932, Serial No. 591,541, and in Germany March 5, 1931.

The invention relates to an apparatus for commutating or periodically interrupting electric currents by means of liquid conductors and concerns more particularly a new form of the movable element of the commutator or interrupter, which element in combination with electrodes and connections arranged according to known principles, for example according to my U. S. Patent No. 1,306,335, is adapted to form simple and reliable commutators and periodical interrupters which in addition possess high adaptability.

According to the invention, the movable element of the commutator or interrupter consists of a series of equidistant substantially one-dimensional or two-dimensional conductors formed of a jet of liquid (a jet conductor series) and moving with the same velocity through a gaseous atmosphere (preferably hydrogen) in the direction of the jet conductor series and perpendicularly or obliquely to the main dimension of the individual conductors. The jet conductor series consists for example of substantially parallel jet portions (a series of so called jet steps) or is formed of a so-called disc jet consisting of a liquid jet with a series of disc-like deformations.

Such a series of jet steps is preferably made in the form of sections of a curved liquid jet made by electromagnetic or mechanical means (for example, by means of a centrifuge which jet may be, for example, undulatory, helical, spiral and doubly curved in a variety of ways.

The disc jet is preferably formed by introducing periodical fluctuations in velocity into the conductive liquid jet, which fluctuations may themselves be produced by for example, by electromagnetic or mechanical means.

In the accompanying drawings,

Figure 19 shows a device for producing a pulsating current having a curve of rectangular shape.

Figures 20, 21 and 22 show different forms of current.

Figure 23 shows a device for producing a double period alternating current.

Figure 25 shows a device for producing a double period pulsating current.

Figure 26 shows voltage and current curves.

Figure 27 shows a device for producing a double period alternating current.

Figures 33 and 34 show in side view and cross-section an arrangement for producing a disc jet.

Figure 35 shows in side view a similar arrangement, and

Figures 36, 37 and 38 show side views of a third, fourth and fifth construction of an arrangement for producing a disc jet.

Figure 1:
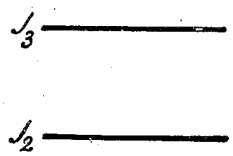
Figure 1 shows a series of jet steps without any connection between the several steps of jet portions.
Figure 2:
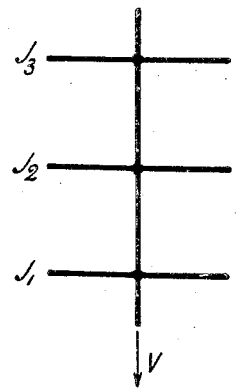
Figure 2 shows a so-called disc jet.

In Figures 1 and 2, $J_1, J_2, J_3 \ldots$ denote equidistant liquid conductors which, forming a conductor series, move with the equal velocity $v$ in the direction of the conductor series. The conductors may have any shape or dimension, provided they are constituted by a liquid jet. There are two principal forms of such conductor series. In one, Figure 1, the conductor series consists of substantially parallel rod-like liquid portions which, however, need not be exactly rectilinear. Such consecutive jet portions are, as a whole, called a series of jet-steps. In the other principal form, which is likewise formed of a jet, the conductors $J_1, J_2, J_3 \ldots$ consist of liquid discs which are normally connected together by an axial jet portion as shown in Figure 2. The system shown in Figure 2 is called a disc jet. In regard to the uses coming into consideration herein, these two principal forms of the movable commutator element are of equal value. It will now be shown how they may be used for commutating and for rectifying alternating currents.

Figure 3:
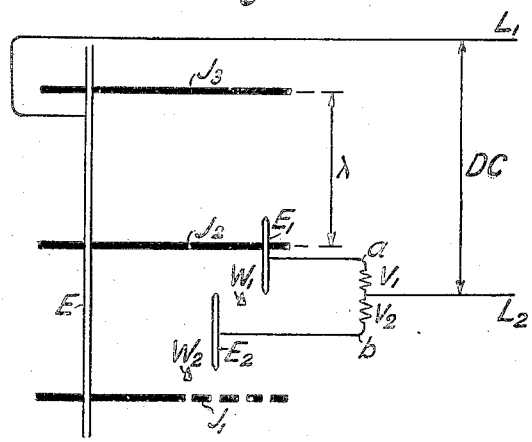
Figures 3 to 6 show diagrammatically four different constructions of the invention serving as alternating current rectifiers.

Figures 3 to 6 show diagrammatically commutators which are based on the principle of the conductor series. Figure 3 shows a two-phase commutator or rectifier. $V_1 V_2$ denote the secondary winding of a transformer with centre tapping. The outer poles $a$ and $b$ are each connected to a fixed electrode $E_1$ and $E_2$ respectively.

Figure 4:
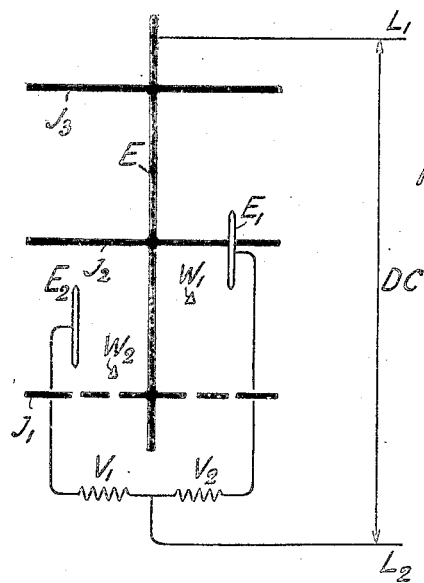

Each electrode has a dimension $\lambda/2$ in the direction of movement of the conductor series $J_1 J_2 J_3 \ldots$ where $\lambda$ is the distance between the individual conductors. E is a third electrode to which the conductors are always connected, at all events as long as they contact the electrode $E_1$ or $E_2$. It is assumed that the conductor series moves forward by a distance $\lambda$ in the complete period of the voltage supplied by the transformer, and that the passage of the individual conductors from the electrode $E_1$ to the electrode $E_2$ takes place approximately at the moment of the change in sign of the voltage. In this case, an ordinary rectified voltage having two pulsations per period of the alternating voltage will be produced between the two conductors $L_1$ and $L_2$, of which the conductor $L_1$ is in permanent electrical connection with the tapping electrode E. In order to render certain the interruption of the contact between the conductors and the electrodes $E_1$ and $E_2$, knives $W_1$ and $W_2$ may be provided for cutting the conductors. In Figure 4, the conductors $J_1, J_2, J_3 \ldots$ are permanently connected together by a jet portion E and together with the latter form, for example, a disc jet. In other respects the arrangement is the same as in Figure 3. This length E is used for instance as the tapping electrode.

Figure 5:
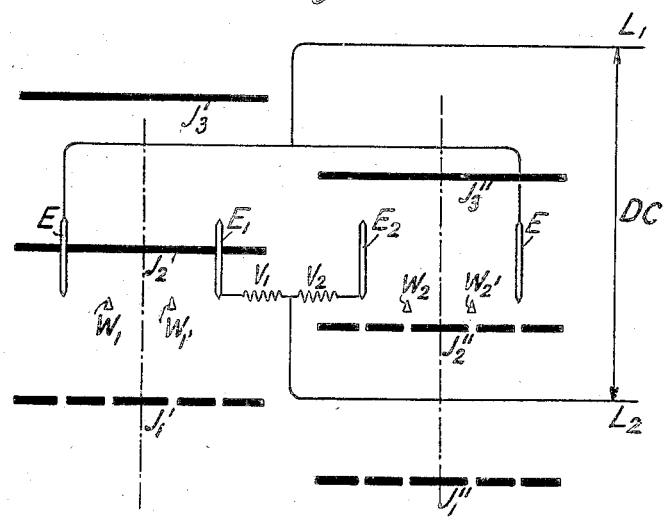

In Figure 5, two conductor series $J_1', J_2', J_3' \ldots$ and $J_1'', J_2'', J_3'' \ldots$ are employed, in a manner which will readily be understood, to form a rectifier, only the half $V_1$ of the secondary winding and the electrodes $E_1$ and E which co-operate with the conductor series $J_1', J_2', J_3' \ldots$ and only the half $V_2$ of the winding and the conductor series $J_1'', J_2''$, $J_3'' \ldots$ with its corresponding electrodes being effective for each alternate half period of the alternating current.

Figure 6:
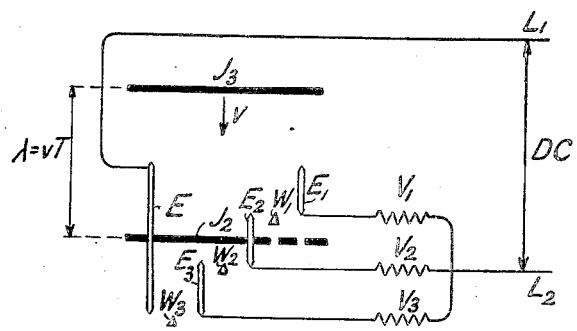

$W_1 W_1'$ and $W_2 W_2'$ are knives. By means of this arrangement, it is possible to make the electrical resistance of the rectifier very small. Figure 6 shows a three-phase rectifier. In this case, the length of each of the electrodes $E_1, E_2, E_3$ is $\lambda/3$, so that each of the phases $V_1, V_2, V_3$ is able to supply current during one-third of a period. In other respects, the construction of this rectifier is analogous to that of Figure 3.

The two principal forms of conductor series or of the movable commutator element may be produced as follows:

A series of jet steps may, in the first place, be formed by cutting up a so-called conical jet wave. In its turn, such a wave may be produced by electromagnetic means by the interaction between a rotating magnetic field F, Figure 7, and a direct current flowing in a conductive liquid jet, the said direct current being supplied by the current source B and being sent into, and taken from, the jet by the nozzle N and an electrode $E'$. The individual turns of the conical wave jet move forward at a distance apart of $\lambda = vT$, where $v$ is the velocity of the original jet and T is the period of the rotating field. One or more series of jet steps may be cut out of the wave jet by means of knives $Y_1$ and $Y_2$, as indicated by the heavy lines $J_1, J_2$ and $J_3$ between the points $a_1$ and $b_1$, $a_2$ and $b_2$ and $a_3$ and $b_3$. Of course, the steps will not be exactly parallel as in the diagrams shown in Figures 1, 3, 5 and 6 but, at the same point of the phase, they will always have the same position relatively to a stationary electrode.

Hence, for use in commutators, this deviation from the ideal case is insignificant. As will be readily understood, two or more series of steps or conductor series may be cut out of one and the same wave-jet. By means of two series of steps displaced relatively to one another by 180° is it possible to make a double commutator as shown in Figure 5. Three series of steps, with an angular interval of 120° suffice for a three-phase commutator or rectifier, and so on.

Figure 7:
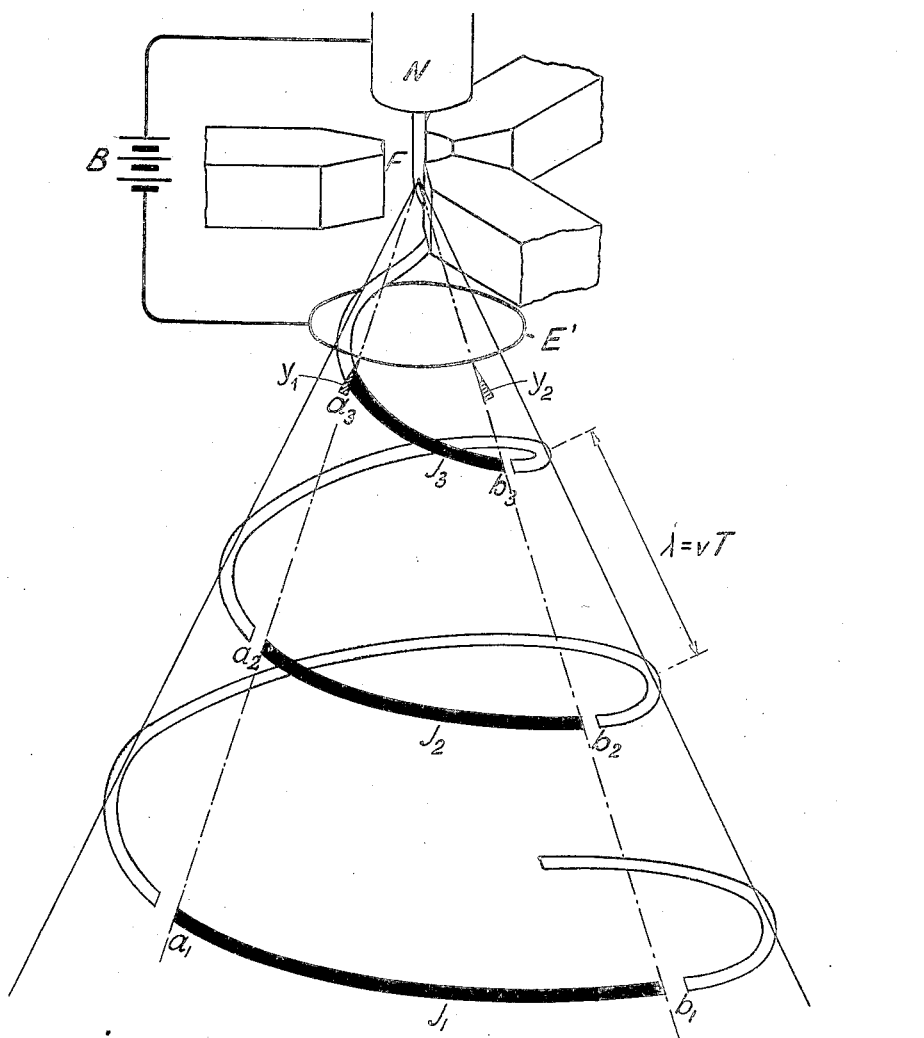
Figure 7 shows a device for producing a conical jet wave from which a jet conductor series may be formed by cutting up the jet.
Figure 8:
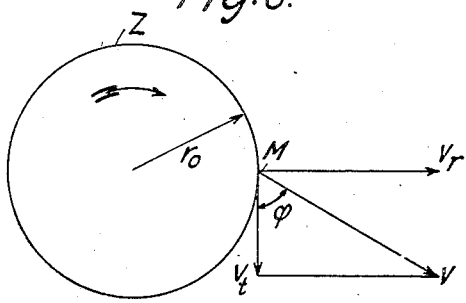
Figure 8 shows a diagram for a centrifuge.

Jet waves of substantially the same character as those shown in Figure 7 may also be produced in a purely mechanical way by means of a revolving drum (centrifuge). Figure 8 shows diagrammatically a top view of such a cylindrical centrifuge Z provided on its periphery with a hole M. When the centrifuge is entirely filled with liquid, the rotation produces an internal pressure which at the wall is given by $$h = \frac{2\pi^2 n^2 r_0^2}{g}$$

cm. of a column of liquid, where $r_0$ is the radius and $n$ the number of revolutions per second. There flows through the hole a jet, the velocity of whose particles is radial relatively to the centrifuge and has a magnitude of $$v_r = \sqrt{\left(h_0 + \frac{2\pi^2 n^2 r_0^2}{g}\right) 2g} \text{ cm/sec.}$$

where $h_0$ is the pressure in the centrifuge, expressed in cm. of a column of liquid. On leaving the centrifuge, the particles of liquid also have a peripheral velocity $v_t = 2\pi r_0 n$, so that the resultant velocity $v$ of the liquid particles makes an angle $\phi$ with the periphery of the centrifuge, where $\phi$ is less than 90°. The magnitude of $\phi$ depends upon the pressure already existing in the axis.

When $h_0 = 0$, $v_r = v_t$ and $\phi = 45°$. When $h_0$ is very large in comparison with $$\frac{2\pi^2 n^2 r_0^2}{g},$$

Figure 9:
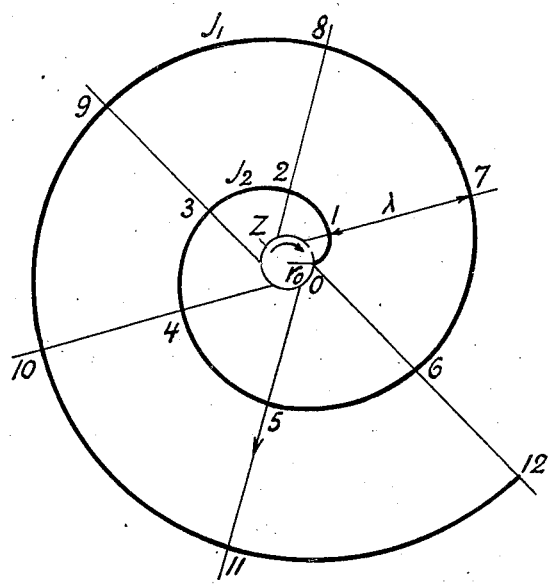
Figure 9 shows a spiral liquid jet produced by means of a centrifuge, from which a jet conductor series can be produced by cutting up the jet.

$\phi$ approaches 90°. The particles projected in succession from the jet hole M form an approximately plane spiral wave. The properties of the spiral wave are particularly characteristic in the case in which $h_0 = 0$. Such a wave is shown in Figure 9. The particles 1, 2 ... 11, 12 left the centrifuge $$1 \cdot \frac{T}{6}, \ 2 \cdot \frac{T}{6} \cdots 11 \cdot \frac{T}{6}, \ 12 \cdot \frac{T}{6}$$

seconds previously, where T is the time for one revolution of the centrifuge. They have moved along the lines 1—7, 2—8 ... 5—11, 0—6 with the velocity $$v = 2\pi r_0 n \sqrt{2}.$$

The distance $\lambda$ through which a particle travels during one revolution of the centrifuge, that is 0—6, 1—7 and so on, is called a wave length. It is $$\lambda = v \cdot T = \frac{v}{n} = 2\pi r_0 \sqrt{2}.$$

It will be seen that this distance, and hence the spiral wave, is independent of the speed of rotation and is only dependent upon $r_0$. If it is desired to use the wave for constructing a rectifier commutator, the centrifuge must be mounted on the shaft of a synchronous motor. Then the spiral wave is fixedly connected, in regard to time, to the alternating voltage. This means that the spiral wave, at a certain point of the phase, for example at the point of zero voltage, always occupies the same position relatively to a stationary electrode, this position—for $h_0 = 0$ being quite independent of the frequency. A commutator provided with such a wave, therefore, in regard to its setting, is independent of the frequency. As with the wave shown in Figure 7, a number of series of steps for operating a number of commutators may be made from a single spiral wave like that shown in Figure 9.

Figure 10:
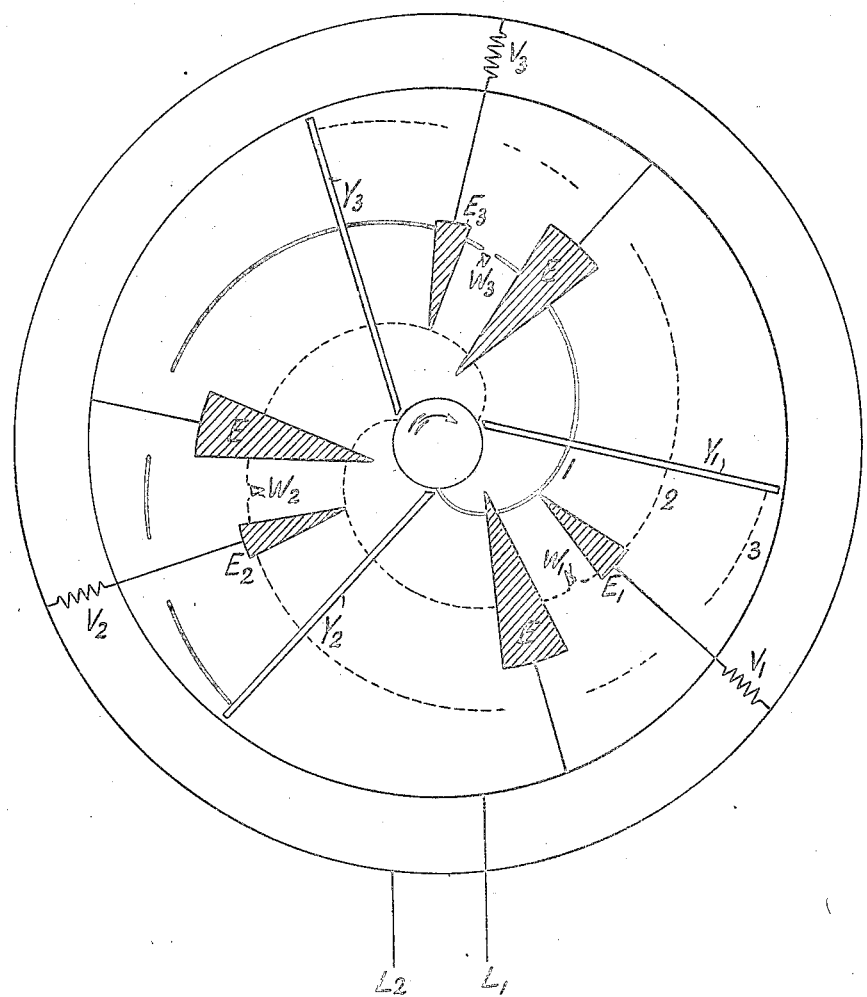
Figure 10 shows a three-phase rectifier.

Figure 10 shows for example a three-phase rectifier. The three series of jet steps are separated from one another by insulating partions $Y_1$, $Y_2$ and $Y_3$. It is assumed that the centrifuge rotates once in each period of the alternating voltage. The electrical connections of the rectifier and the arrangement of the electrodes and knives are substantially the same as in Figure 6, except that the electrodes are sector-shaped and are placed in a circle, and the lead $L_1$ is connected to three electrodes E instead of to one electrode. The centrifuge may, however, perform for example one-half of a revolution per period, in which case, of course, the angular spacing of the electrodes must also be halved, that is to say, the number of electrodes must be doubled.

Figure 11:
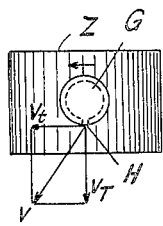
Figures 11, 12 and 13 show a side view of a centrifuge the adjustable jet nozzle of which occupies different positions.
Figure 12:
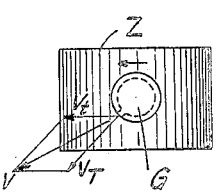
Figure 13:
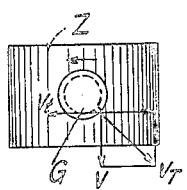
Figure 14:
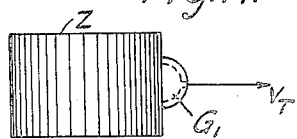
Figures 14 and 15 show a side view and plan of another centrifuge.
Figure 16:
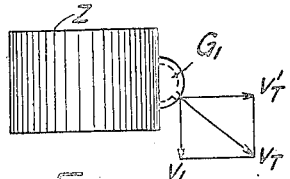
Figures 16 and 17 show views of the same centrifuge in which the nozzle occupies a different position.
Figure 15:
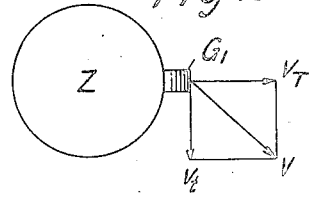
Figure 17:
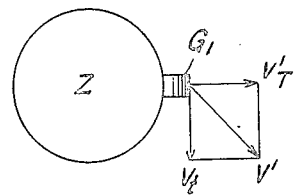

It is possible, by means of a centrifuge, to make not only plane spiral waves as mentioned in the foregoing, but also different forms of substantially conical waves. Figures 11 to 17 are intended to make this clear. In Figures 11 to 13, the centrifuge Z rotating about its vertical axis is provided with a jet nozzle G which is adapted to turn about a radial axis and which, in its cylindrical surface is provided with a jet-hole H, so that the jet can be directed in all directions in a tangential plane. In the cases, shown in Figures 11 and 12, the jet waves which are produced lie on a hyperboloid of revolution having a vertical axis. In the case, Figure 13, in which the horizontal component of the velocity of flow is just equal to $v_t$ a helical wave lying on a vertical cylinder is produced.

In the devices shown in Figures 14 to 17, the jet nozzle $G_1$ is adapted to be turned about a tangential axis, so that in this case it is possible to produce substantially conical jet waves, which when the centrifuge rotates synchronously, are adapted for commutating alternating currents.

A series of jet steps may also be made from a so-called plane jet wave having a double wave length. The jet-wave, Figure 18, having its parts all moving along straight lines, is made in known manner from a conductive liquid jet by the interaction between a constant magnetic field F and an alternating current which is sent through the jet by means of the electrode $E''$ and is of half the periodicity of the alternating current to be commutated. The wave portions $a_1$—$b_1$, $a_2$—$b_2$, $a_3$—$b_3$ ... cut out by means of the knives $Y_1$ and $Y_2$ form substantially a series of jet steps, the steps of which, however, are not exactly parallel. This fact, however, is only slightly perceptible, assuming that only the steps are used which are comparatively far removed from the origin of the jet-wave. It is necessary, however, to produce a double period alternating current, which may be effected in the first place of course by means of a frequency transformer unit. It is, however, possible to use for this purpose certain systems of jet waves. Such an arrangement is shown in Figure 19. It consists of a simple known jet wave commutator or interruptor, having its field magnet, however, provided with two windings $M_1$ and $M_2$. One winding $M_2$ is fed with direct current and the other $M_1$ with alternating current, the two currents being so designed that in every alternate half period the maximum magnetic effect of the alternating current is just cancelled by the effect of the direct current $i_a$.

A pulsating field, varying with respect to time as shown in Figure 20, is thus obtained. If direct current from the current source B is sent through the jet, a jet wave like that shown in Figure 19 is produced by the interaction between the current and a field impulse such as 1—2, Figure 20.

If the fixed electrode E, provided with a knife W, is arranged at a distance $\lambda$ from the center of the field F where $\lambda = vT$ ($v$ being the velocity of the jet and of the jet wave, and T the period of the alternating current in the winding $M_1$) the wave produced by the magnetic impulse 1—2, Figure 20, will just be cut through by the knife W at the time 2, Figure 20, and the current through the jet-wave will thereby be interrupted. The new, undeflected jet only reaches the electrode E, and thereby re-closing the circuit B N J E, after the lapse of a new time interval T, hence at the time 3. A new wave is formed which is cut at the time 4, Figure 20, after the said circuit has been closed during the interval 3—4. Hence, a pulsating, rectangular current, like that indicated in Figure 21, will flow in the circuit B N J E. If two commutators of the type shown in Figure 19 are combined as shown in Figure 23 and provision is made for one commutator to close the connection when the other commutator opens the connection, a rectangular alternating current, as shown in Figure 22, will flow in a branch circuit between the leads $L_1$ and $L_2$, which current is of double the period 2T of the alternating current flowing in the winding $M_1$. This double period alternating current may then be employed for producing a jet wave in the manner explained in reference to Figure 18.

Figure 18:
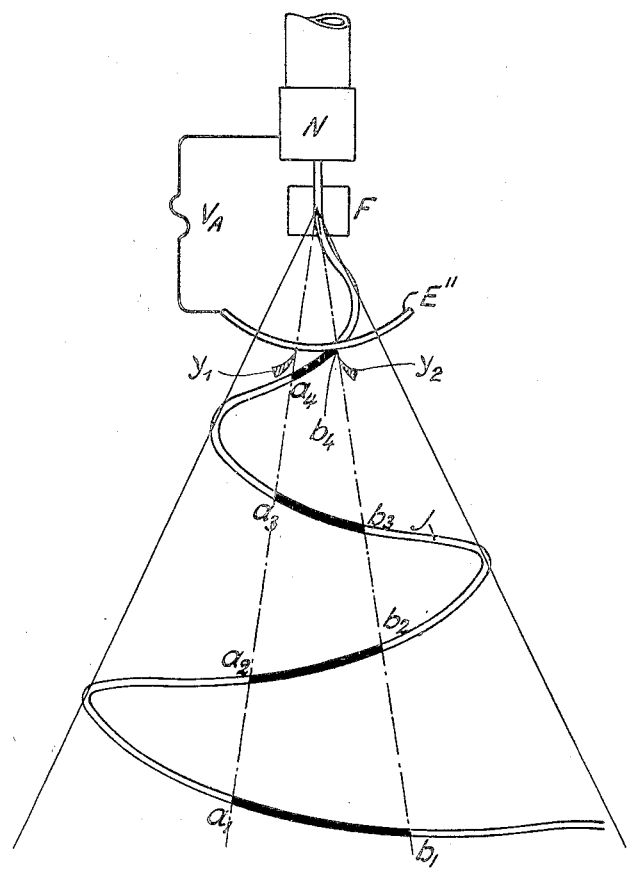
Figure 18 shows a device for making a jet wave.
Figure 24:
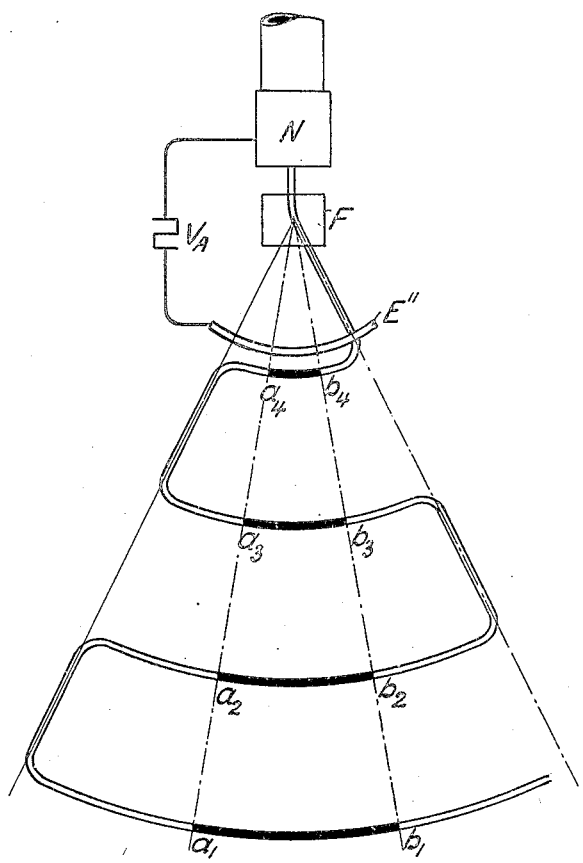
Figure 24 shows a device for producing a double period jet wave.

The wave thus obtained is better adapted for producing a series of jet-steps than that shown in Figure 18, because it has substantially the somewhat idealized form indicated in Figure 24, that is to say, the middle portions of the wave-branches are all parallel to one another. This property is due of course to the rectangular form of the exciting current.

Figures 25 and 26 are intended to show another method of making a double period alternating current. If an alternating current circuit e V E J N which contains self induction 1 but very little resistance is closed at the beginning 1 of a period, Figure 26, a current is obtained which, during the period T in question, varies approximately according to the curve $K_1$ in Figure 26. If the circuit is closed by a wave jet interruptor provided with a constant magnetic field F, Figure 25, and the electrode E with the knife W is placed at a distance of $\lambda = vT$ from the field, then as in the preceding case, Figure 19, the circuit will be interrupted automatically after the lapse of a period T and will remain interrupted during the next period, whereupon it will again be closed for one period and so on. There thus flows in the circuit a current consisting of impulses such as $K_1$, $K_3$ ... (Figure 26). By means of a suitably constructed double commutator, Figure 27, it is then possible to produce again a complete double period alternating current such as $K_1$, $K_2$, $K_3$ ... in Figure 26 which can be employed for producing a double period jet wave. The wave will have substantially the shape of the wave shown in Figure 18 and therefore will scarcely be as suitable for producing a series of jet-steps as the wave in Figure 24.

Figures 28, 29:
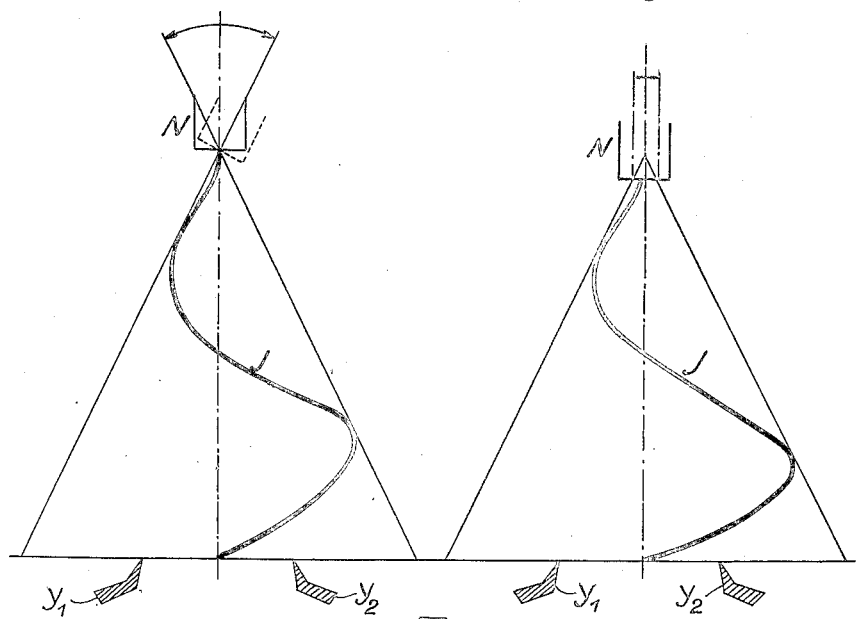
Figures 28 and 29 show, respectively, a wave jet produced by means of an oscillating and a reciprocating nozzle.
Figure 30:
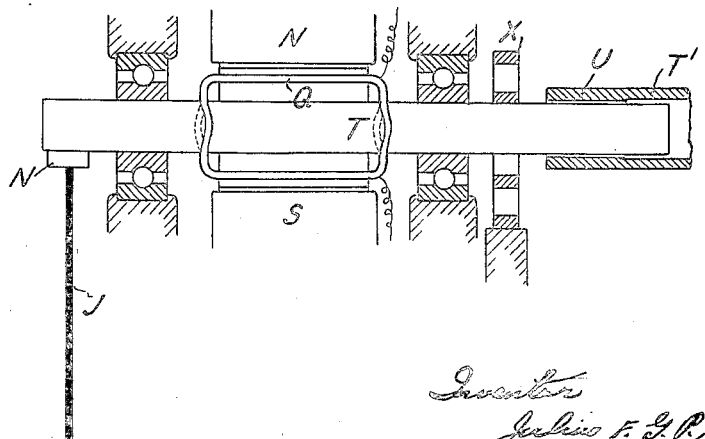
Figure 30 shows a longitudinal section through a nozzle driving device.

The double period jet wave may be produced not only electromagnetically, but also by mechanical vibrations of a double period. For this purpose, a jet nozzle N may either be oscillated (Figure 28) or reciprocated in translatory movement (Figure 29). Figure 30 shows diagrammatically by way of example a suitable arrangement for producing such oscillations. The jet pipe T, to the end of which is fitted radially a nozzle N, constitutes a hollow shaft mounted to vibrate angularly in ball bearings O and carrying a winding Q through which flows the double period alternating current. The winding Q is substantially arranged in a plane through the axis of the pipe T.

The pipe or shaft T with the winding Q secured thereon cooperates with a constant magnetic field (indicated by N—S) to form a vibrating or oscillating system as will be readily understood. The entire oscillating system is tuned, by means of a torsion spring X connected to the pipe T, to a natural frequency which is equal to half the frequency of the alternating current to be commutated. The conductive liquid is supplied axially to the pipe T from the fixed pipe T' through a stuffing box U.

Figure 31:
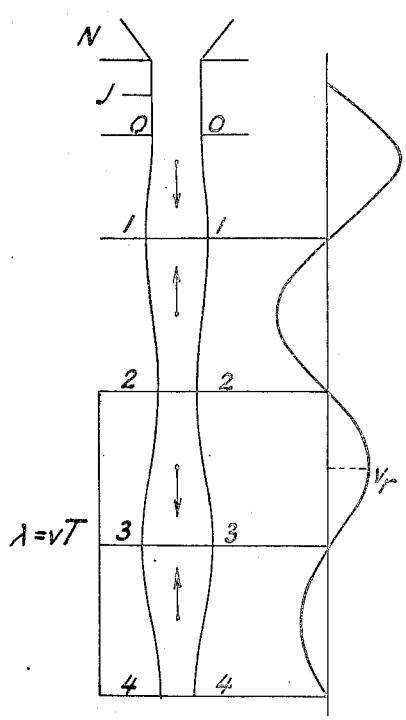
Figures 31 and 32 show a liquid jet with periodically superimposed fluctuations in velocity and a disc jet.

The second principal form of conductor series, namely the disc jet may be produced in the following manner:

In Figure 31, J is a liquid jet flowing with constant velocity $v$ from the nozzle N. At any place on the jet, for example in the cross-section O—O an additional velocity varying periodically with the time is imparted to the passing jet particles. Let the period be T. The jet particles retain to some extent this superimposed velocity when they move downward with the mean velocity $v$ of the jet. Therefore, below the cross-section O—O, there is at any time a system of sections of equal length 1, 1—2, 2 and 2, 2—3, 3 and 3, 3—4, 4 and so on, within which the particles move alternately in the one and in the other direction relatively to the moving jet.

The entire system of sections follows the jet in its movement. The relative velocities disappear as the distance from the section O—O increases, giving rise to locally alternating constrictions and swellings of the jet. The manner in which these deformations are produced will be readily understood from Figure 31. Between two sections with velocities directed towards one another as indicated by the arrows, there will be formed a swelling, while between sections with velocities directed away from one another there will be formed a constriction. That kinetic energy of the jet which arises from the superimposed periodical velocities is transformed by the deformations into potential surface energy, thereby explaining the reduction in the relative velocities $v_r$, see Figure 31 right hand side, and the increase in the deformations downwardly. If the superimposed periodical velocities are large enough, the swellings $P_1$—$P_4$, Figure 32, ultimately assume quite peculiar forms, discs such as $P_3$ and $P_4$ being formed. The discs succeed one another with an interval of $\lambda = v.T$. The jet with the discs may conveniently be called a disc jet. The disc jet or plate jet, as it may also be called, may evidently be utilized directly for commutating and rectifying an alternating current of the period T according to the principle described hereinbefore.

Figure 32:
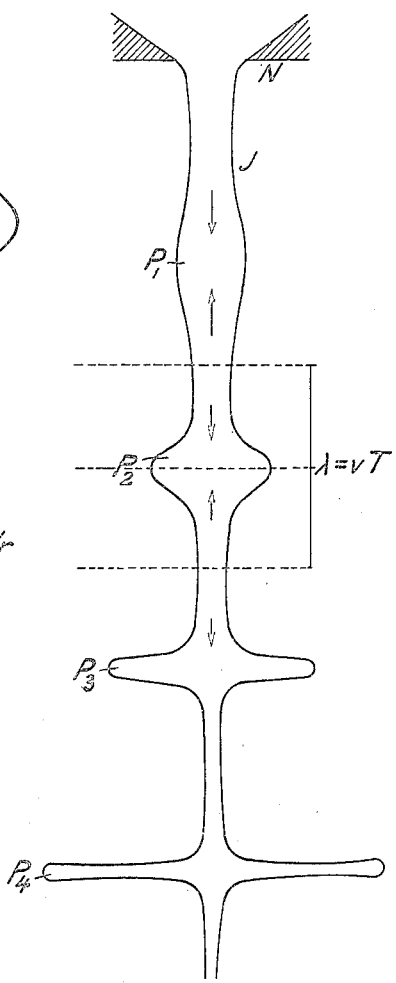

The liquid conductor discs shown in Figs. 2 and 32, such as $P_1$, $P_2$, $P_3$, $P_4$ of Fig. 32 may be separated from the vertical jet by a tubular knife, that is, a pipe having a sharp circular edge. If this edge of the pipe faces the discs, the discs will be separated from the vertical jet in the form of rings. The liquid rings thus separated will fall by the action of gravity and during their downward movement the diameter thereof will be continually increased due to the horizontal velocity component of the liquid particles. Upon continued movement downward the separated discs finally form thin annular stems which by means of suitably disposed knives can be cut to form one or more conductor series such as illustrated in Fig. 1.

An example of a device for introducing the periodical variations in velocity in the jet is shown in Figures 33 and 34. An electromagnetic pump element of known type is provided in the jet pipe T of the jet-forming system R, T, N. The said element embraces a gap, Figure 34, formed between the pole shoes of a magnet $M_1$ $M_2$ and having its walls coated with an insulating layer such as enamel.

By means of two electrodes $c_1$ and $c_2$ it is possible to send through the conductive liquid filling the gap a current perpendicularly to the axis of the gap and to the magnetic flux. The interaction between the magnetic field and the current produces a field of force or of pressure tending to drive the liquid in the direction of the axis of the gap. When it is desired to use the electromagnetic pump for making a disc jet, the current sent through the gap is an alternating current of the frequency of the alternating current which is to be commutated and the field is a constant field. Hence, there is superimposed on the constant pressure in the jet tube an alternating pressure which in its turn gives rise to corresponding periodical superimposed velocity variations in the jet.

The method described may be modified by inserting the pump element in a side branch T'' of the jet pipe as shown in Figure 35. It is, of course, merely a matter of producing periodical pressure variations of suitable frequency above the jet hole, and this may also be attained of course with the arrangement shown in Figure 35. This arrangement functions as follows: A pressure wave moving through the pipe system with the velocity of sound is produced in the pump element. Two wave trains meet in the point P, viz. the waves coming directly from the pump and the waves reflected from the surface of the liquid in the container R. By suitably dimensioning the pipe system, it is possible to cause the two wave systems to add their pressure effects. One advantage of arranging the pump element in a side branch is that the constant velocity $v$ of the jet is not effected by the hydrodynamic and electromagnetic resistance of the pump element.

The velocity variations may also be introduced electromagnetically in the manner shown in Figure 36. The jet J passes through a constant magnetic field F having its lines of force perpendicular to the jet and to the plane of the drawing. Within the field, two knife-shaped electrodes $e_1$ and $e_2$ cut a very slight distance into the jet so as to pare off two very small shavings. By means of the electrodes, an alternating current of the period T in question—supplied by transformer V—is sent through the jet. The interaction between this current and the field brings about periodical velocity variations of the period T which in turn give rise to the same disc-shaped deformations as in the preceding case.

A device for introducing periodical variations of velocity mechanically into the jet is shown diagrammatically in Figure 37. A disc D immersed in the liquid in a container R is set in translational vibration of the suitable periodicity so as to produce pressure waves of the same periodicity. Of course, the disc may be set vibrating in a number of ways. In Figure 37 this is effected by means of an electromagnetic system of the type known in loudspeakers, the disc D being secured to one end of a rod K which carries a coil C through which an alternating current flows and which cooperates with a constant magnetic field N—S. The accelerations of the liquid particles in the container R brought about in this way will have the same effect in deforming the jet issuing from the nozzle N as the above mentioned pressure waves, and the necessary periodical forces do not need to be at all excessive because the jet is extremely sensitive to vertical vibrations. In Figure 38, the entire jet-forming system is suspended by a spring U in such a way that the said system is given a natural frequency in accordance with the period of a given alternating voltage. The system is set oscillating by means of the armature A and the double winding S consisting of a winding for direct current and another winding for alternating current.

The resultant field should be that shown in Figure 20 if an alternating voltage synchronous with the winding alternating current is to be commutated. Since the jet is extremely sensitive to vertical vibrations, the oscillations of the jet-producing system and the forces necessary for producing them need only be small.

Of course, the periodical fluctuations in velocity may also be introduced into the jet by vibrations of only a part of the jet-forming system, for example of the nozzle.

Having thus fully described my invention I claim as new and desire to secure by Letters Patent:

1. For use in an apparatus for closing and interrupting an electric circuit, a device including means for producing and maintaining a conductive liquid jet moving freely through a gaseous atmosphere and means for influencing said jet to form therefrom a series of equidistant conductors moving successively at equal velocity through said atmosphere in a direction forming a substantial angle with the main dimension of the individual conductors.

2. For use in an apparatus for closing and interrupting an electric circuit, a device including means for producing and maintaining a conductive liquid jet moving freely through a gaseous atmosphere, means for forming bends on said jet, and knives for cutting out from the bends a series of substantially parallel conductive liquid jet portions moving with equal velocity through said atmosphere in a direction substantially perpendicular to the individual jet portions thus separated from the jet.

3. For use in an apparatus for closing and interrupting an electric circuit, a device including means for producing and maintaining a conductive liquid jet moving freely through a gaseous atmosphere, and means for producing from the liquid particles of said jet a series of equidistant disc-shaped protuberances moving with equal velocity in the direction of the jet.

4. The device of claim 1, in which said means for influencing the jet comprise means for forming the same to a conical spiral, and knives for cutting out sections of the conical spiral jet to form a jet conductor series.

5. The device of claim 1, comprising a rotatable container having a hole through which a conductive liquid may be caused to issue to form a spiral jet during the rotation of said container, and cutting means for cutting out sections of such spiral jet to form a jet conductor series.

6. The device of claim 1, comprising a jet nozzle, means for producing a plane wave jet of conductive liquid issuing from said nozzle, and cutting means for cutting out sections of such wave jet to form a jet conductor series.

7. The device of claim 3, in which said means for forming the disc-shaped protuberances on the jet serve to introduce periodical fluctuations of velocity into the jet.

8. The device of claim 3, in which said means for producing the disc-shaped protuberances on the jet consists of an electromagnetic pump introducing periodical fluctuations of velocity into the jet.

9. The device of claim 3, in which said means for producing the disc-shaped protuberances on the jet comprise means for sending an alternating current transversely through the jet and a constant magnetic field having its lines of force perpendicular to the jet and to the direction of the current whereby through the interaction between said alternating current and said magnetic field periodical fluctuations in velocity are introduced into the jet to thereby form the disc-shaped protuberances thereon.

10. The device of claim 3, in which said means for producing the disc-shaped protuberances on said jet are adapted to transmit vibrations mechanically to at least part of said jet-producing means so as to introduce periodical fluctuations in velocity into the jet to form the disc-shaped protuberances thereon.

11. In an apparatus for rectifying an alternating voltage, in combination, means for producing a conductive liquid jet moving freely through a gaseous atmosphere, means for influencing said jet to form therefrom a series of equidistant conductors moving at equal velocity through said atmosphere in a direction forming a substantial angle with the main dimension of the individual conductors, and electrodes which are positioned to successively make electrical contact with the conductors of said series.

12. The device of claim 11, in which said means for influencing the conductive liquid jet serve to form a series of equidistant disc-like deformations on the same.

13. The device of claim 11, in which one of said electrodes is of such length in the direction of movement of the conductor series as to remain in electrical contact with each conductor during a complete period of the voltage to be rectified, and the other electrodes are of such length as to each remain in electrical contact with each conductor during only a fraction of a complete period of the voltage to be rectified, said last named electrodes being positioned successively to be successively touched by each conductor while the same remains in electrical contact with the first-named long electrode.

14. The device of claim 11, in which said means for influencing the conductive liquid jet include a device for bending the jet to form a series of plane waves of a frequency half as great as that of the voltage to be rectified, and cutting means for cutting out sections of said waves to thereby form a series of equidistant conductors.

JULIUS FREDERIK GEORG POUL HARTMANN.